March 8, 1927
L. HOVER
CULTIVATOR ATTACHMENT FOR TRACTORS
Filed Aug. 5, 1924
1,620,099
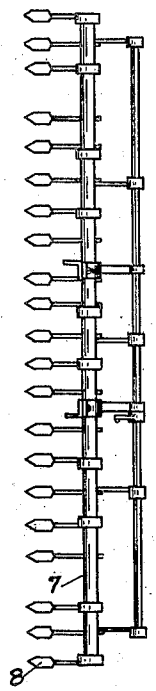
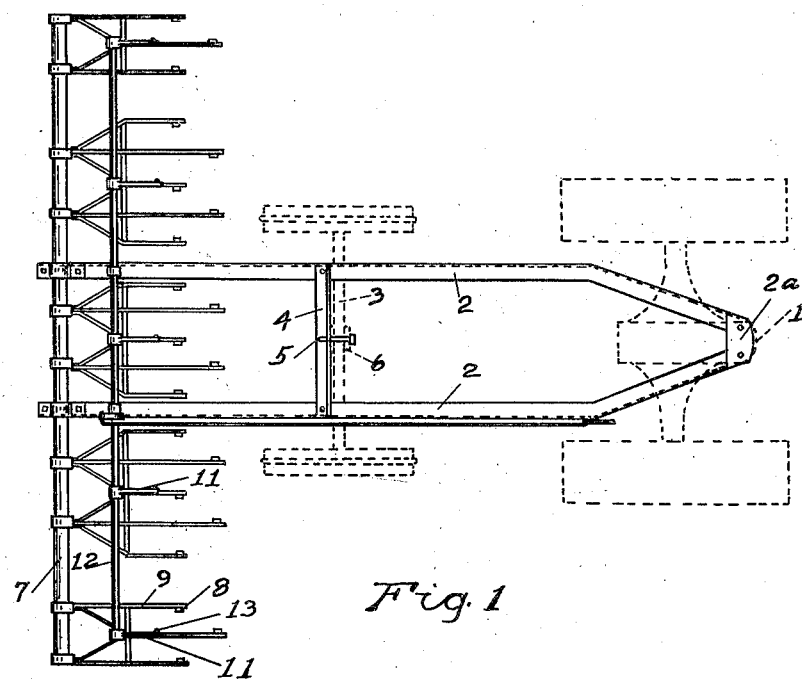
Fig. 1
Fig. 2
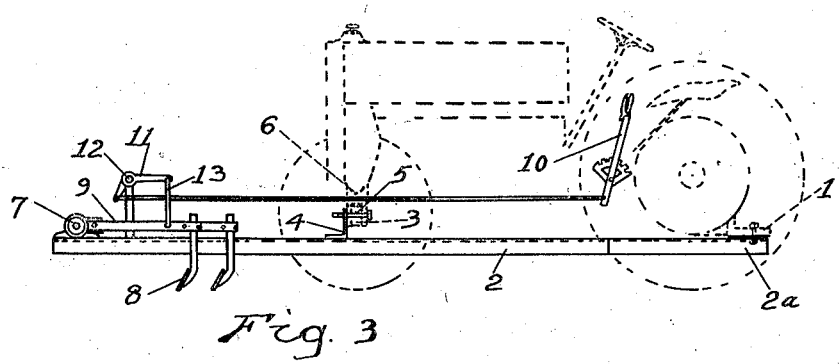
Fig. 3
Loren Hover
INVENTOR
BY
ATTORNEY Patented Mar. 8, 1927.

1,620,099

UNITED STATES PATENT OFFICE.

LOREN HOVER, OF SAGINAW, MICHIGAN, ASSIGNOR OF ONE-HALF TO ELMER HOPKINS, OF SAGINAW, MICHIGAN.

CULTIVATOR ATTACHMENT FOR TRACTORS.

Application filed August 5, 1924. Serial No. 730,140.

This invention is a cultivator attachment for tractors and the improvement pertains more particularly to a novel construction and combination of parts whereby the objects of my invention are attained.

These objects are to provide a cultivator attachment that can be easily and quickly secured to or removed from a tractor and which is adapted to be pushed ahead of the tractor. The pushing force is applied by the tractor at the rear end of its draw-bar so that the tractor, which is designed and built for pulling is now made to push the cultivator, although the tractor itself is in effect pulling the load. The result is that the tractor is operated under the conditions of load to which it is best adapted. Yet the cultivator, traveling in advance of the tractor can be guided properly along the rows to be cultivated because it is directly in front of the driver.

A further object of my improvement is to provide a cultivator attachment of the class described with means whereby the operator can raise or lower the cultivator points without leaving his seat.

With these and certain other objects in view which will appear later in the specifications, my invention consists in the devices described and claimed and the equivalents thereof.

In the drawings Fig. 1 is a top plan view of the cultivator attachment, the tractor indicated by dotted lines.
Fig. 2 is a front view of the cultivator parts shown in Fig. 1.

Fig. 3 is a side view showing diagrammatically the preferred method of attaching the cultivator to the tractor.
Numeral 1 indicates the usual draw-bar of the tractor, designed as is customary, to pull its load. 2 is the pushing frame, which forms a part of the cultivator attachment. The frame is located beneath the tractor and is connected at its rear end 2ª directly to the rear end of the draw-bar. The frame 2 extends forward underneath the front axle and close to it and projects in advance of the front end of the tractor, being supported at the front axle 3 by means of an apertured cross bar 4, which slidingly receives the end of the pin 5, commonly used to fasten the trunnion 6 of the tractor to the axle.

The front ends of the two side members of the push frame 2 preferably carry a horizontal transversely extending non-rotatable bar 7, the ends of which project beyond the sides of the tractor as shown in Fig. 1. Suitable cultivating tools 8 are mounted on arms 9 which are preferably pivoted to the bar 7.

All of the cultivator tools can be raised simultaneously by the tractor operator. Various means may be employed for this purpose, but I prefer the arrangement illustrated herein. Pulling the hand lever 10 lifts the pivoted arms 9 by means of the connecting L-lever 11, rock shaft 12 and links 13.

While I have shown and described a specific arrangement of the cultivator tools and means for raising and lowering them it will be understood that any other desired devices or implements can be mounted on the bar 7 without departing from the spirit of my invention as set forth in the claim.

The frame 2 pushes its load, namely, the cultivator, ahead of the tractor, but the pushing strain is all on the draw bar 1 and is a pulling strain, consequently the tractor is always operating under the conditions for which it is best adapted, that is, pulling a load. This results in satisfactory guiding of the cultivator without liability of sidewise weaving, and produces steadier steering of the tractor, and no pushing strain is brought on the front of the axle.

The cross bar 4 and pin 5 enable the front part of the frame 2 to be easily and quickly attached and detached. In fact the frame can be applied to or removed from the tractor very quickly and easily by simply slipping the apertured bar 4 over the front end of the pin 5 and then bolting the rear end 2ª of frame 2 to the draw bar 1, as shown in Figs. 1 and 3.

Having thus described my invention, what I claim and desire to secure by Letters Patent is:

The combination with a tractor having a draw bar and a front axle, of a cultivator frame comprising a pair of side members spaced apart, located close to the draw bar and extending lengthwise from the rear end of said bar beneath the front axle and in advance of the tractor, the rear end of said frame secured direct to the rear end of the draw bar, a cross brace on said frame, a pin projecting horizontally from said axle and slidingly engaging said brace, and tools carried by the projecting end of said frame.

In testimony whereof, I affix my signature.

LOREN HOVER.